United States Patent
Madsen

(10) Patent No.: US 8,299,398 B2
(45) Date of Patent: Oct. 30, 2012

(54) POWER SUPPLY CONFIGURED TO DELIVER AC WELDING-TYPE POWER

(75) Inventor: Michael D. Madsen, Fremont, WI (US)

(73) Assignee: Illinois Tool Works Inc., Glenview, IL (US)

( * ) Notice: Subject to any disclaimer, the term of this patent is extended or adjusted under 35 U.S.C. 154(b) by 475 days.

(21) Appl. No.: 11/836,898

(22) Filed: Aug. 10, 2007

(65) Prior Publication Data
US 2009/0039063 A1   Feb. 12, 2009

(51) Int. Cl.
*B23K 9/10* (2006.01)
*B23K 9/12* (2006.01)

(52) U.S. Cl. ............... 219/130.1; 219/130.5; 219/137.7

(58) Field of Classification Search ............... 219/130.1, 219/130.5, 137 PS, 137.7, 137.71
See application file for complete search history.

(56) References Cited

U.S. PATENT DOCUMENTS

| | | | |
|---|---|---|---|
| 4,947,021 A | 8/1990 | Stave | |
| 5,710,696 A * | 1/1998 | Reynolds et al. | 363/37 |
| 5,864,110 A * | 1/1999 | Moriguchi et al. | 219/121.57 |
| 6,111,216 A | 8/2000 | Stava | |
| 7,053,329 B2 * | 5/2006 | Samler | 219/75 |
| 2005/0279742 A1 | 12/2005 | Stava | |

FOREIGN PATENT DOCUMENTS

| | | |
|---|---|---|
| EP | 0538227 A1 | 4/1993 |
| EP | 1023965 B1 | 3/2005 |
| EP | 1671737 A2 * | 6/2006 |
| EP | 2176945 A1 | 4/2010 |
| JP | 1701057 C | 10/1992 |
| KR | 20100037131 A | 4/2010 |
| WO | 2009023366 A1 | 2/2009 |

* cited by examiner

*Primary Examiner* — Henry Yuen
*Assistant Examiner* — Ayub Maye
(74) *Attorney, Agent, or Firm* — Quarles & Brady LLP

(57) ABSTRACT

A welding-type power source includes a primary inverter configured to generate a first AC power and a transformer having a primary side configured to receive the first AC power and a secondary side configured to deliver a second AC power. The welding-type power source further includes a converter configured to convert the second AC power to DC power and a half-bridge inverter configured to receive the DC power and having a first output and second output configured to deliver respective portions of an AC welding-type power to a welding output to generate a welding-type arc during a welding-type process. An inductance is connected at a first end to the first output and the second output of the half-bridge inverter and connected at a second end to the welding output. Additionally, a circuit is included that is configured to receive an energy stored in the inductance during delivery of one portion of the AC welding-type power and deliver the energy back to the inductance during delivery of another portion of the AC welding-type power.

19 Claims, 4 Drawing Sheets

POWER SUPPLY CONFIGURED TO DELIVER AC WELDING-TYPE POWER

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to a welding-type system and, more particularly, to a system and method for providing AC welding power using an output inverter having a half-bridge inverter topology.

Welding-type systems, such as welders, plasma cutters, and induction heaters, often include an inverter-based power source that is designed to condition high power to carrying out a desired process. These inverter-based power sources, often referred to as switched-mode power supplies, can take many forms. For example, they may include a half-bridge inverter topology, a full-bridge inverter topology, a forward-converter topology, a flyback topology, a boost-converter topology, a buck-converter topology, and combinations thereof.

Particularly in systems dedicated to driving a welding process, it is sometimes advantageous to provide an alternating current (AC) output power. For example, it is well known that an AC output power is helpful when welding certain metals, such as aluminum. In particular, during a welding process, the aluminum reacts with air and an oxide is formed on the surface of aluminum. This oxide is an electrical insulator and has a higher melting point than the base metal. By periodically reversing the output current from an electrode negative condition to an electrode positive condition, the oxide is removed from the surface and the clean base metal is exposed to the arc.

A wide variety of welding-type power supplies have been developed that are capable of providing an AC output power to drive a welding-type process. In fact, it is relatively easy to re-establish the welding arc when reversing the polarity from electrode positive to electrode negative because the thermionic tungsten electrodes typically used with such processes supply electrons to reignite the arc. However, it is more difficult to re-establish the welding arc when reversing the polarity from electrode negative to electrode positive because the molten weld pool is not a particularly good emitter of electrons until the arc voltage is high enough to initiate cold-cathode emission. Without a high enough restrike voltage, arc rectification can occur during the electrode positive condition.

To this end, the output inverters in such systems are typically designed to provide a relatively high (or excessive) voltage to ensure that sufficient voltage is provided to avoid arc rectification. Accordingly, a full-bridge output inverter topology has frequently been employed in order to ensure that the switches of the output inverter could handle the relatively high voltages required to ensure that sufficient voltage is provided to avoid arc rectification.

It was readily recognized that a half-bridge output inverter topology would be desirable because it would reduce the size, weight, and cost of the output inverter. A half-bridge inverter topology utilizes one diode drop and one transistor drop in the output current path, while a full-bridge inverter topology utilizes one diode drop and two transistor drops in the output current path. However, in may cases, a half-bridge topology was foregone because the cost of a single output transistor and diode that could withstand the peak voltage stress was too high. The peak voltage is determined by the minimum voltage necessary to sustain the arc during current reversal.

Also, during current reversal a clamp or snubber circuit must be present to absorb the energy present in the parasitic inductance of the welding cables. This commutation energy is proportional to the parasitic load inductance times the load current squared and must be transferred to the output snubber during every current reversal. Thus, the power handling requirement of the snubber must be equal to the commutation energy times twice the output switching frequency.

In order to reduce overall system complexity, some systems employ a resistor through which this commutation energy is dissipated as heat. However, this design requires a large resistor that increases the overall system size and weight and generates a significant amount of heat during operation. Accordingly, some systems have used a flyback converter to transfer the energy from the output circuit back to the primary bus of the inverter-based power source. While such designs provide increased system efficiency over simply dissipating the commutation energy across a resistor, it is relatively complex to design and costly to manufacture.

Accordingly, when designing an output inverter topology two design constraints must be balanced. The first is the overall switching complexity of the output inverter and the cost and weight associated therewith. The second is the ability of the output inverter and associated circuits to manage the commutation energy stored in the parasitic inductance of the output/welding cables and any other inductance associated with the output.

Therefore, it would be desirable to have a system and method for reducing the cost, weight, and complexity of the output inverter and managing the commutation energy stored in the parasitic inductance of the output/welding cables and any other inductance associated with the output.

BRIEF SUMMARY OF THE INVENTION

The present invention overcomes the aforementioned drawbacks by providing a system and method for providing an AC welding-type power using an output inverter having a half-bridge topology and a clamp circuit configured to deliver the commutation energy back into the welding output.

In accordance with one aspect of the present invention, a welding-type power source is disclosed that includes a primary inverter configured to generate a first AC power and a transformer having a primary side configured to receive the first AC power and a secondary side configured to deliver a second AC power. The welding-type power source further includes a converter configured to convert the second AC power to DC power and a half-bridge inverter configured to receive the DC power and having a first output and second output configured to deliver respective portions of an AC welding-type power to a welding output to generate a welding-type arc during a welding-type process. An inductance is connected at a first end to the first output and the second output of the half-bridge inverter and connected at a second end to the welding output. The inductance can be a discrete magnetic component, for example a wire wound on a magnetic core, a parasitic component, for example a length of output cable, or a combination thereof. Additionally, a circuit is included that is configured to receive an energy stored in the inductance during delivery of one portion of the AC welding-type power and deliver the energy back to the non-coupled inductance during delivery of another portion of the AC welding-type power.

In accordance with another aspect of the present invention, a welding-type power source is disclosed that includes an inverter-based power source configured to provide a welding-type power and an output inverter connected to receive the welding-type power and generate an output power having periodic reversals of a polarity. The welding-type power source further includes first output and a second output connected to the output inverter to deliver the output power through a connection to a welding-type electrode and a workpiece, respectively, to generate a welding-type arc between the welding-type electrode and the workpiece to effectuate a welding-type process. A circuit is connected between the inverter-based power source and the first and second output and including an energy storage device connected to receive a commutation energy associated with the periodic reversals of the polarity of the output power and deliver the commutation energy to one of the first output and the second output during a reversal of the polarity of the output power to substantially reduce occurrences of rectification in the welding-type arc during the welding-type process.

In accordance with yet another aspect of the present invention, a welding-type power source is disclosed that includes a transformer having a primary side configured to receive an input AC power and a secondary side configured to deliver an output AC power, a converter configured to convert the output AC power to DC power, and an inverter connected configured to receive the DC power and generate an AC welding-type power having a first half cycle and a second half cycle. A first output is configured to deliver an output power to a connection first parasitic inductance associated therewith to deliver the output power to a welding-type torch. A second output is configured to deliver the welding power to a connection having a second parasitic inductance associated therewith to deliver the output power to a workpiece. The welding-type power source further includes an energy storage device connected to receive a commutation energy associated with the parasitic inductance connected to the first output during the first half cycle and deliver the commutation energy to the second output during the second half cycle.

In accordance with still another aspect of the invention, a welding-type power source is disclosed that includes a primary inverter configured to generate a first AC power, a transformer having a primary side configured to receive the first AC power and a secondary side configured to deliver a second AC power, and a converter configured to convert the second AC power to DC power. A half-bridge inverter is configured to receive the DC power and having a first output and second output configured to deliver respective portions of an AC welding-type power to a welding output to generate a welding-type arc during a welding-type process. The welding-type power source further includes an inductance connected at a first end to the first output and the second output of the half-bridge inverter and connected at a second end to the welding output.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
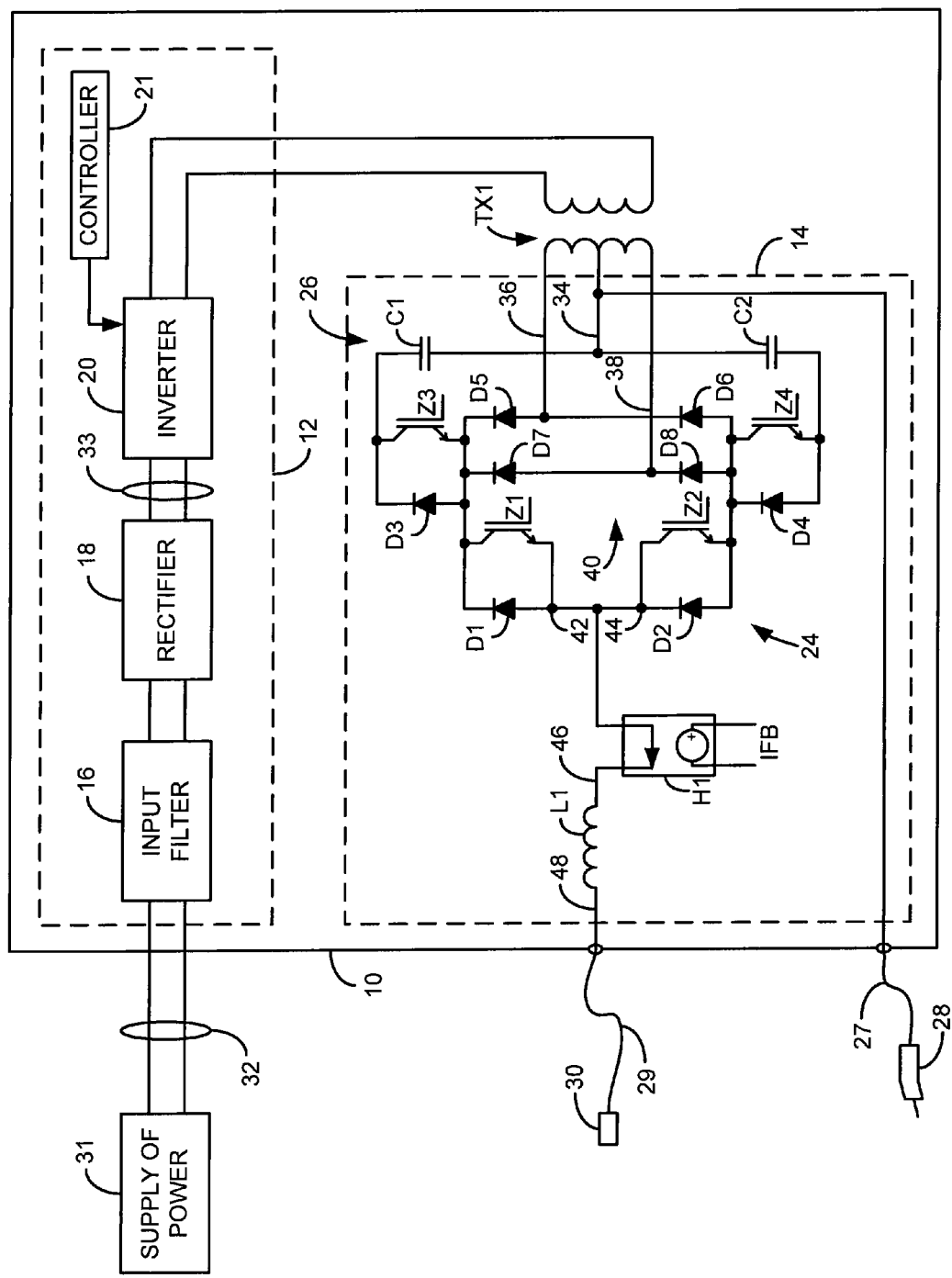
FIG. 1 is a schematic illustration of an inverter-based power source including a half-bridge output inverter and clamp circuit in accordance with the present invention.

Referring now to FIG. 1, a welding-type power source system 10 is designed to provide an AC welding-type power. To this end, the welding-type power source system can be divided into two parts 12, 14. The first part 12 includes the components typically included in a traditional inverter-based welding-type power source that is configured to deliver direct current (DC) welding-type power. The second part 14 includes the components, in accordance with the present invention, designed to convert the DC welding-type power to AC welding-type power.

As is well known, the first part 12 generally includes an input filter 16, an input rectifier 18, and an inverter 20 controlled by a controller 21. Although the system 10 will be described as including an input rectifier 18, it is contemplated that the first part 12 may or may not include an input rectifier 18 and other components, for example a boost converter. The first part 12 is a simplified overview of common components of an inverter-based welding-type power source and, thus, it is contemplated that additional components may be included, such as filtering components, feedback and control loops, and transformers or other converters designed to provide a desired output power characteristic.

The second part 14 generally includes an output inverter 24 and a clamp circuit 26. As will be described below, the output inverter 24, clamp circuit 26 and associated components are specifically designed to reduce the cost, weight, and complexity of the output inverter 24 and efficiently manage commutation energy stored components associated with the output. The output of the second part 14 is connected by a weld cable 27 to a welding electrode 28 and a workpiece cable 29 to a workpiece clamp 30. The first part 12 and the second part 14 are joined by a transformer TX1.

The system 10 is connected to a supply of power 31 that provides AC power, for example, as received from a utility grid over transmission power lines 32. The input rectifier 18 is designed to receive the AC power from the supply of power 31 and convert the AC power to DC power that is delivered to a DC bus 33. Specifically, the input rectifier 18 includes a plurality of switches that rectify the AC power received from the supply of power 31.

The DC power is delivered from the rectifier 18 over the DC bus 33 to the inverter 20. The inverter 20 of the first part 12 will be hereinafter referred to as the primary-side inverter 20 and includes a plurality of switching devices (e.g., IGBTs or other semiconductor switches) that are positioned between the positive and negative buses of the DC bus 33. The function of the primary-side inverter 20 is to control the output current in the welding arc. The controller 21 causes the specific combinations of the switches forming the inverter 20 to open and close and, thereby, sequentially generate pulses that are delivered to the transformer TX1 with the desired voltage and current characteristics.

It is contemplated that transformer TX1 is a step-down transformer that is driven by the primary side inverter 20. The transformer TX1 has a center tapped output 34 that is connected to the clamp circuit 26 and, as illustrated, to the electrode 28 through the weld cable 27. However, it is contemplated that the weld cable 27 and workpiece cable 29 may be switched, so that the center tapped output 24 is connected to the workpiece cable 29 and, thereby, the workpiece clamp 30. The remaining taps 36, 38 of the transformer TX1 are connected to the output inverter 24. Thus, these output taps 34, 36, 38 can be referred to as connecting to the "weld windings."

Specifically, the transformer TX1 is connected to the output inverter 24 through a plurality of diodes, including diode pairs D5, D7 and D6, D8, that form a rectifier 40 configured to rectify the AC power received from the transformer TX1 via the taps 36, 38 to provide DC power to the output inverter 24.

The output inverter 24, as illustrated in FIG. 1, is arranged in a half-bridge topology. However, as will be described, other topologies are contemplated. As is common to the topology, the half-bridge output inverter 24 includes two switches Z1, Z2. In this regard, the output inverter 24 can be described to have two halves that form first and second outputs 42, 44 configured to deliver respective portions of the AC welding-type power to a welding output to generate a welding-type arc during a welding-type process.

A non-coupled output inductor L1 is connected at a first end 46 to the first and second outputs 42, 44 of the output inverter 24 through an output current transducer H1 and at a second end 48 to the workpiece 30 through the workpiece cable 29. However, again, it is contemplated that the weld cable 27 and workpiece cable 29 may be switched, so that the second end of the output inductor L1 is connected to the welding cable 27 and, thereby, the electrode 28. The inductor L1 can be the inductance formed by winding a conductor on a magnetic core, the output inductance formed by the secondary winding of a series injection high frequency transformer, the parasitic inductance of a length of output cable, or a combination thereof. The output current transducer H1 is used to provide an output current feedback signal, which is used to control for the inverter 20 of the first part 12. In addition to the inductance of the output inductor L1, a lumped output inductance formed by the secondary winding of a series injection high frequency transformer, if present (not shown), and the parasitic load inductance of the connected output cable 29 (or 27) will also be present and, as will be described, is managed by the clamp circuit 26.

The clamp circuit 26 includes a pair of energy storage devices embodied in the illustrated arrangement as capacitors C1, C2 that act as resonant clamp capacitors, which are precharged to a voltage higher than the output voltage of transformer TX1. The clamp circuit 26 also includes a plurality of diodes D1-D4 and a pair of switches Z3, Z4. As will be described, the diodes D1-D4 are designed to provide a current path for the energy stored in the output inductor L1 and the lumped output inductance to be transferred to the clamp capacitors C1, C2. The switches Z3, Z4 provide a current path for the energy in the clamp capacitors C1, C2 to be transferred back to the output inductor L1 as current in the opposite direction.

In operation, during an electrode negative condition, Z1 is switched on to provide a current path from secondary windings of TX1 through diodes D5, D7 (either one or both diode D5 and diode D7 based on the state of the primary side inverter 20), switch Z1, and main inductor L1 to form the welding arc from workpiece 30 to the electrode 28. Therefore, during electrode negative operation, switch Z1 is switched on and main inductor L1 has an established current flowing from work to electrode.

To reverse the output current from electrode negative to electrode positive, switch Z1 is switched off. Since current cannot instantaneously change in L1 (and the parasitic inductance) and can no longer flow through Z1, current continues to flow through the arc from workpiece 30 to the electrode 28, through capacitor C2, diode D4, diode D2, and main inductor L1. A resonant circuit is formed by main inductor L1 and capacitor C2. As the current in main inductor L1 decreases, the voltage at capacitor C2 increases from an initial condition.

Switches Z2 and Z4 are switched on after switch Z1 is switched off, but before the current in main inductor L1 reaches zero. This provides a path for capacitor C2 to transfer energy back to main inductor L1 as current from the electrode 28 to the workpiece 30. At the time when the current in main inductor L1 reaches zero, the voltage on capacitor C2 is at a maximum value. The maximum voltage on capacitor C2 is the voltage available at the arc to maintain current flow as it reverses direction. The maximum voltage on capacitor C2 is given by:

$$V_{c2} = \sqrt{\frac{L1 \cdot I_{L1}^2}{C2 + V_{C2}(\text{initial})^2}} \,.  \qquad \text{Eqn. 1}$$

As the voltage on capacitor C2 decreases, the current in main inductor L1 increases. When the voltage on capacitor C2 returns to its initial condition, switch Z4 is switched off and the current in main inductor L1 has almost the same magnitude it had before Z1 switched off, but current is now flowing from the electrode 28 to the workpiece 30. The current magnitude is slightly less due to losses in the components in the resonant current path.

During electrode positive operation, Z2 is switched on to provide a current path from secondary windings of TX1 through diodes D6, D8 (either one or both diodes D6 and D8 depending on the state of the primary side inverter), switch Z2, and main inductor L1 to form the welding arc from the electrode 28 to the workpiece 30. Thus, during electrode positive operation, switch Z2 is switched on and main inductor L1 has an established current flowing from electrode to work.

To reverse the output current from electrode positive to electrode negative, switch Z2 is switched off. Again, since current cannot instantaneously change in main inductor L1, but can no longer flow through Z2, current flows through the arc from the electrode 28 to the workpiece 30, through main inductor L1, diode D1, diode D3, and capacitor C1.

A resonant circuit is formed by main inductor L1 and capacitor C1. As the current in main inductor L1 decreases, the voltage at capacitor C1 increases from an initial condition. At the time when the current in main inductor L1 is zero, the voltage on capacitor C1 is at its maximum value. The maximum voltage on capacitor C1 is the voltage available at the arc to maintain current flow as it reverses direction. The maximum voltage on capacitor C1 is given by:

$$V_{c1} = \sqrt{\frac{L1 \cdot I_{L1}^2}{C2 + V_{C1}(\text{initial})^2}} \,.  \qquad \text{Eqn. 2}$$

Switches Z1 and Z3 are switched on after switch Z2 is switched off, but before the current in main inductor L1 reaches zero. This provides a path for capacitor C1 to transfer energy back to main inductor L1, as current from the workpiece 30 to the electrode 28. As the voltage on capacitor C1 decreases, the current in main inductor L1 increases. When the voltage on capacitor C1 returns to its initial condition, switch Z3 is switched off and the current in main inductor L1 has almost the same magnitude it had before switch Z2 switched off, but current is now flowing from the workpiece 30 to the electrode 28. The current magnitude is slightly less due to losses in the components in the resonant current path.

The amount of energy which must be absorbed by either capacitor C1 or capacitor C2 during polarity reversal is equal to one half of the lumped output inductance (i.e., the inductance of the main inductor L1 and the parasitic inductance of the cables 27, 29 and any other associated components) multiplied by the square of the output current. The initial voltages on capacitor C1 and capacitor C2 are determined when the output energy is a minimum (low current and low inductance). On the other hand, the values of capacitor C1 and capacitor C2 are selected based on the maximum output energy requirements (high current and high inductance).

When the output energy is a minimum, there is very little energy transfer and the maximum capacitor voltage is only a few volts higher than the initial capacitor voltage. Therefore, the initial capacitor voltage must be high enough so that current flow is maintained in the arc as it transitions through zero and arc rectification is avoided. This initial capacitor voltage is typically about 200 volts.

When the output energy is a maximum, the maximum capacitor voltage can be several hundred volts higher than the initial capacitor voltage. As can be seen in FIG. 1, the voltages across the switches Z1-Z4 are clamped to the sum of the voltages on capacitor C1 and capacitor C2 by diodes D1-D4. Therefore, the values of the capacitors C1, C2 are selected so that the sum of the maximum voltage of one capacitor and the initial voltage of the other capacitor is less than the voltage ratings of the semiconductor components, Z1-Z4 and D1-D4. For example, one typical rating is 600 volts. With this in mind, a value of approximately 20 μF would be desirable for the capacitors C1, C2. The values of capacitors C1 and C2 should be as small as possible so that the size and cost of the capacitors are reduced.

Figure 4:
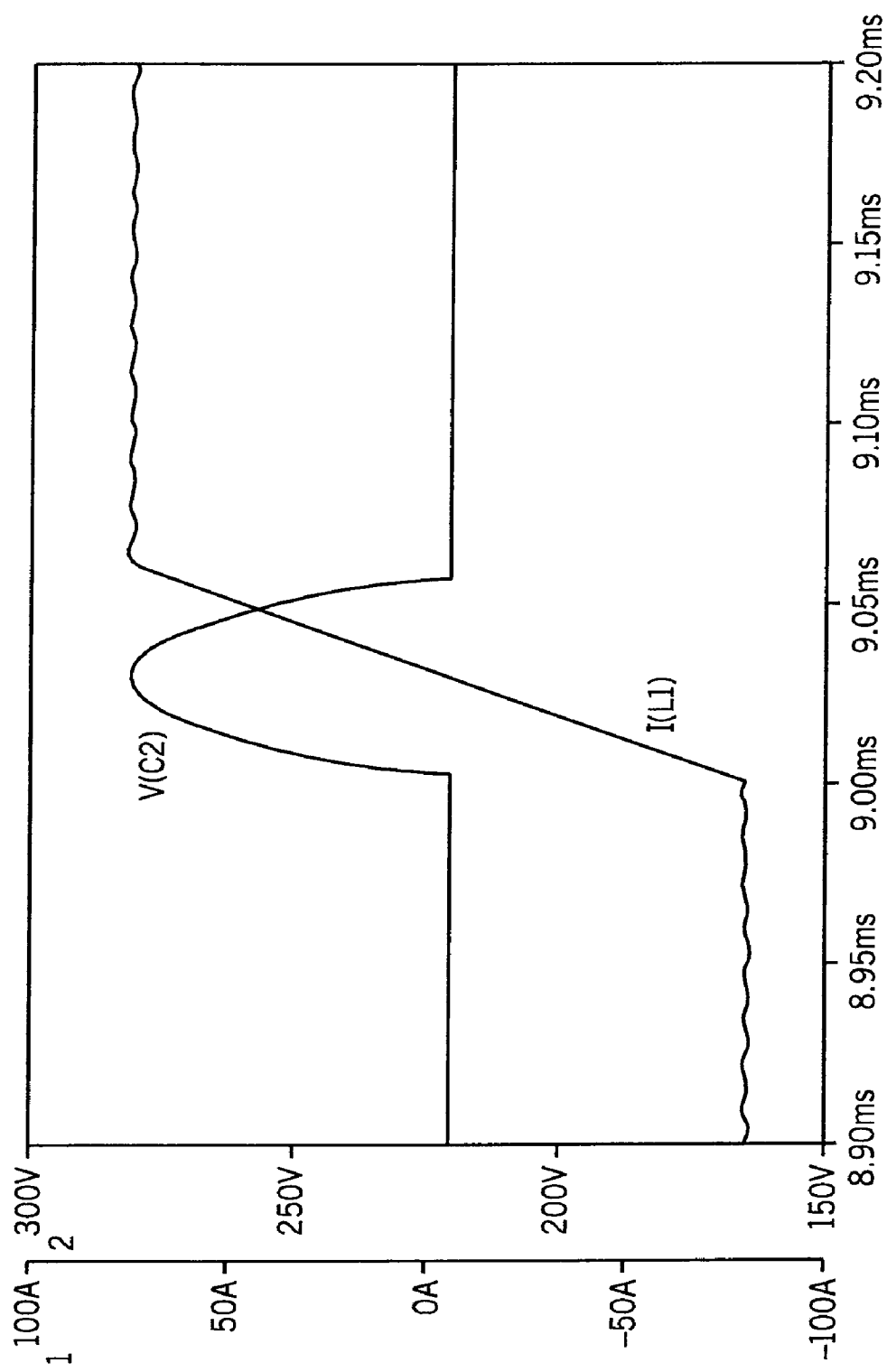
FIG. 4 is a graph showing voltage and current through an output inductance of the systems of FIGS. 1-4 during a current reversal.

Referring now to FIG. 4 and eqns. 1 and 2, the voltage of the clamp capacitors C1, C2 reaches a peak when the output current through main inductor L1 is zero. This is precisely the time that the peak voltage is needed to prevent arc rectification. Also, Eqns. 1 and 2 show that the peak voltage of a capacitor C1, C2 is higher if the inductance at the output (main inductor L1 and parasitic inductance) is higher. This higher voltage keeps the change in output current with respect to time (di/dt) relatively high to maintain the output current as it transitions through zero. In particular, the output di/dt is given by:

$$\frac{di_{L1+parasitic}}{dt} = \frac{V_{C2}}{L1}. \qquad \text{Eqn. 3}$$

Figure 2:
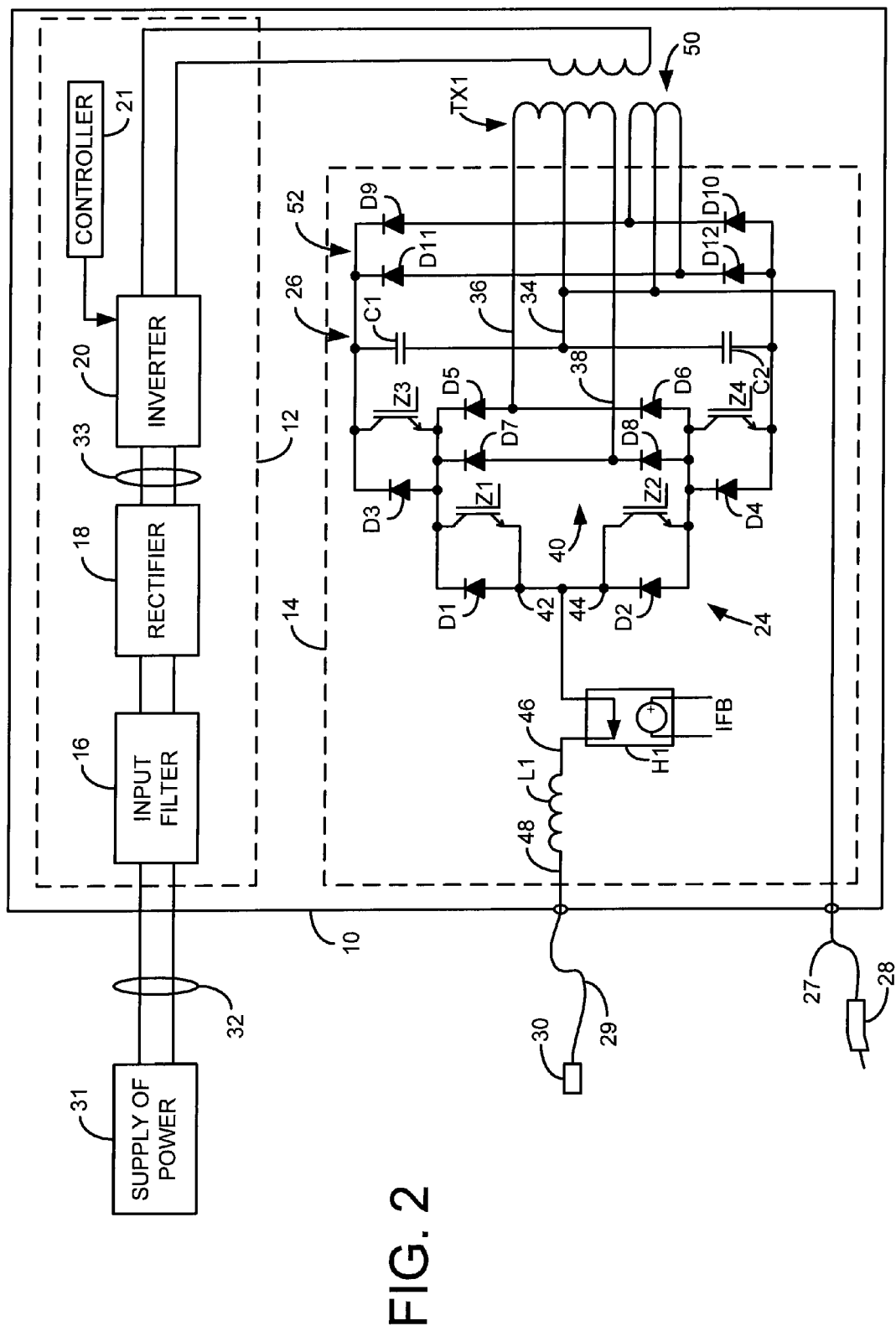
FIG. 2 is a schematic illustration of the inverter-based power source of FIG. 1 including clamp capacitor pre-charge circuit.

Accordingly, it may be desirable to pre-charge the capacitors C1, C2, for example, to approximately 200 volts. Referring now to FIG. 2, in accordance with one embodiment, output boost windings 50 already present on the output transformer TX1 are utilized to pre-charge the clamp capacitors C1, C2 to an initial voltage of approximately 200 volts. A clamp capacitor pre-charge circuit 52 is connected to the boost windings 50 of the output transformer TX1. The clamp capacitor pre-charge circuit 52 includes an additional center tapped output winding on the transformer TX1 and diodes D9-D12. The output boost windings 50 are typically used for welding high cellulose stick electrodes on an open root joint. The output boost windings 50 increase the available output voltage under load and prevent the arc from extinguishing as the operator manipulates the welding electrode 28 across the joint. Since the output boost windings 50 are only used to provide high voltage at a reduced current, they are usually magnetically decoupled from the primary winding of transformer TX1, creating a drooping characteristic of the output boost circuit. In other words, the peak output current provided by the output boost windings 50 is current limited even when driving a short circuit. Because of this, diodes D9-D12 are small and are only used to pre-charge the clamp capacitors C1, C2 to a desired initial voltage when the inverter power source (i.e., the first part 12) is enabled.

When the inverter power source is initially enabled, the output weld windings can also charge the clamp capacitors through diode D5 or diode D7 and diode D3 or diode D4. The output weld windings are very tightly coupled to the transformer TX1 primary winding and are capable of providing several hundred amperes, which could stress diode D5 and diode D7 or, more likely, diode D3 and diode D4, which are much smaller than diode D5 and diode D7. In this case, the controller 21 adjusts the pulse width of the primary side inverter 20 for a period of time to allow the clamp capacitors C1, C2 to charge to the peak output voltage of the weld windings with reduced power characteristic. After the clamp capacitors C1, C2 are charged to the peak output voltage of the weld windings, the controller 20 sets the pulse width back to a value desired for welding and the output boost windings will continue to charge capacitor C1 and capacitor C2 through diodes D9-D12 to the desired initial voltage.

Figure 3:
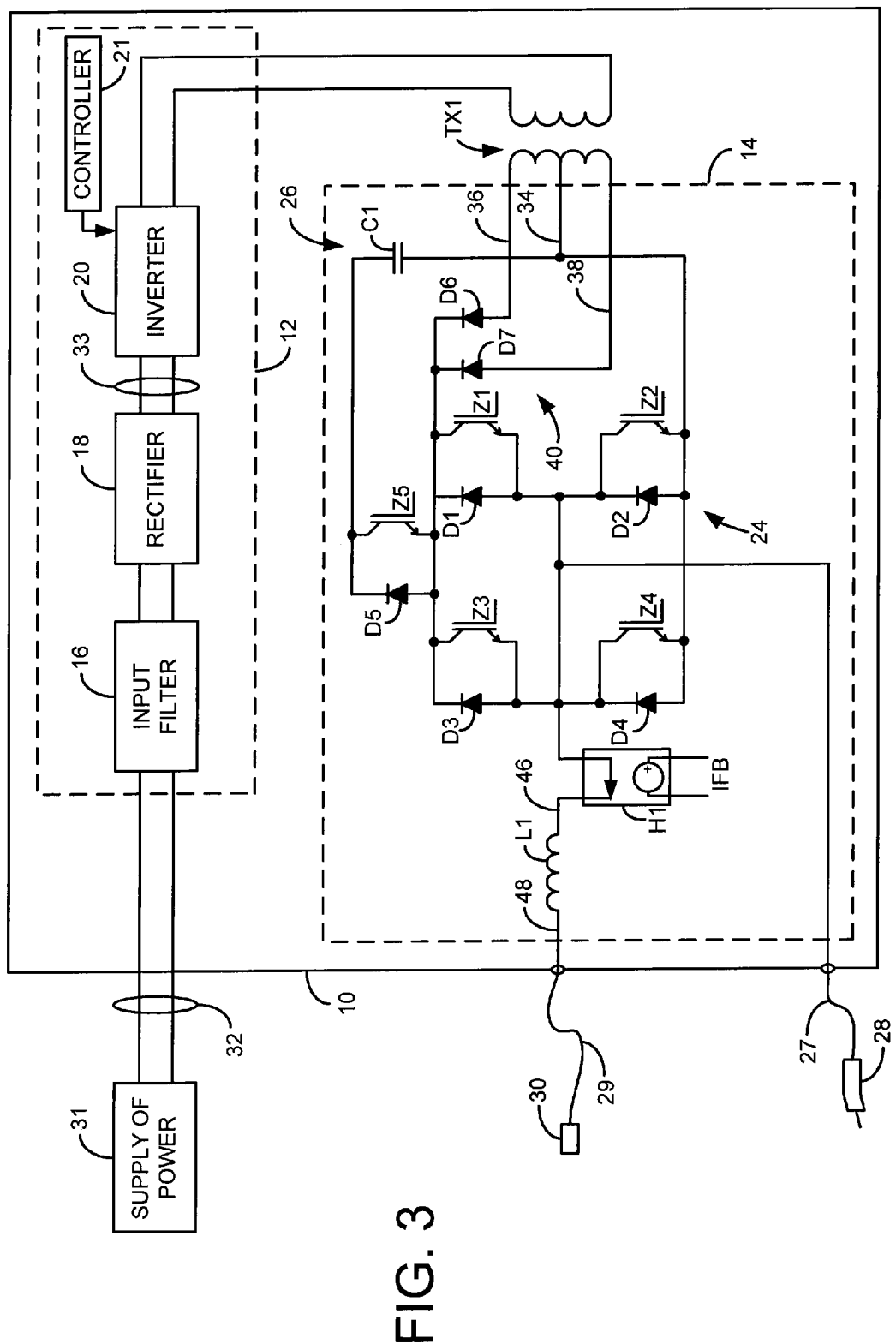
FIG. 3 is a schematic illustration of an inverter-based power source including a full-bridge output inverter and clamp circuit in accordance with the present invention.

It is contemplated that the above-described resonant arc assist/clamp circuit can be utilized with a full bridge output inverter. Referring to FIG. 3, two output rectifying diodes are eliminated and two output transistors Z3, Z4 are added. Additionally, the resonant arc assist/clamp circuit is reduced to one capacitor C1, five diodes D1-D5, and one other switch Z5.

However, this system, while protecting against arc rectification, utilizes output transistors Z3, Z4, which are considerably more expensive than the output rectifying diodes that were eliminated. Also, there is an additional transistor forward drop in the output current path, which can add hundreds of watts to the output circuit losses. Hence, this configuration foregoes some of the advantages of the system described above with respect to FIGS. 1 and 2. That is, above-described invention allows the use of a half-bridge output inverter versus a full-bridge output inverter, which reduces power source size, weight, and cost. The resonant arc assist/clamp circuit provides sufficient voltage to maintain output current during polarity reversal and prevent arc recitification, while also protecting the output semiconductors from failing due to excessive voltage.

The present invention provides a simplified clamp circuit over those used previously. The clamp circuit can be reduced to include only two capacitors, four uncontrolled switches (diodes), and two controlled switches (transistors). One of the two capacitors resonates with the load inductance during current reversal, depending on the initial direction of output current. The commutation energy due to parasitic load inductance is transferred to one of the capacitors as voltage, then back onto the parasitic load inductance as current in the opposite direction.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

I claim:

1. A welding-type power source comprising:
a primary inverter configured to generate a first AC power;
a transformer having a primary side configured to receive the first AC power and a secondary side configured to deliver a second AC power;
a converter configured to convert the second AC power to DC power;
a half-bridge inverter configured to receive the DC power and provide a switched current path for a negative portion and a positive portion of an AC welding-type power, the half-bridge inverter having a first switch and a second switch and a first output and a second output configured to deliver the negative portion and the positive portions of the AC welding-type power to a welding output to generate a welding-type arc during a welding-type process;
an inductance connected at a first end to the first output and the second output of the half-bridge inverter and connected at a second end to the welding output, the inductance to store energy, and deliver an energy stored in the inductance during the negative portion and the positive portion of the AC welding-type power;
a circuit configured to receive the energy stored in the inductance during delivery of one portion of the AC welding-type power and deliver the energy back to the inductance during delivery of another portion of the AC welding-type power;
wherein during the negative portion, the first switch is switched on to provide a first current path from the secondary side, through the converter, through the first switch, and through the inductance to form the welding-type arc, and to reverse the first current path, the first switch is switched off to provide a second current path through a first resonant circuit including the inductance; and
wherein during the positive portion, the second switch is switched on to provide a third current path from the secondary side, through the converter, through the second switch, and through the inductance to form the welding-type arc, and to reverse the third current path, the second switch is switched off to provide a fourth current path through a second resonant circuit including the inductance.

2. The welding-type power source of claim 1 wherein the inductance is formed by a non-coupled inductor.

3. The welding-type power source of claim 1 wherein the inductance is a parasitic inductance of a cable.

4. The welding-type power source of claim 1 wherein the circuit includes an energy storage device connected to receive the energy stored in the inductance and release the energy upon a periodic reversal of a polarity of the AC welding-type power.

5. The welding-type power source of claim 4 wherein the circuit is further configured to control the energy storage device to release the energy received from the inductance back to the inductance to substantially reduce occurrences of rectification in the welding-type arc during the welding-type process.

6. The welding-type power source of claim 1 further comprising one of a welding-type cable connected to a welding-type torch and a workpiece cable connected to a workpiece clamp, each having a parasitic inductance associated therewith, and wherein the circuit is configured to receive a commutation energy stored in the parasitic inductance.

7. The welding-type power source of claim 4 further comprising a pre-charging circuit configured to pre-charge the energy storage device upon startup of the welding-type power source.

8. The welding-type power source of claim 7 wherein the transformer includes a boost winding and wherein the pre-charging circuit is connected to receive power from the boost winding to pre-charge the energy storage device.

9. The welding-type power source of claim 7 wherein the pre-charging circuit is connected to receive the second AC power from the transformer to pre-charge the energy storage device.

10. The welding-type power source of claim 9 further comprising a controller configured to adjust a pulse width of the primary inverter for a period of time during startup of the welding-type power source and wherein the pre-charging circuit is configured to only pre-charge the energy storage device during the period of time.

11. A welding-type power source comprising:
an inverter-based power source configured to provide a welding-type power;
an output inverter connected to receive the welding-type power and generate an output power having periodic reversals of a polarity;
a first output and a second output connected to the output inverter to deliver the output power through an inductance to a welding-type electrode and a workpiece, respectively, to generate a welding-type arc between the welding-type electrode and the workpiece to effectuate a welding-type process, the inductance connected at a first end to one of the first output and the second output and connected at a second end to one of the welding-type electrode and the workpiece;
a circuit connected between the inverter-based power source and the first and second output and including an energy storage device connected to receive a commutation energy associated with the periodic reversals of the polarity of the output power and deliver the commutation energy to one of the first output and the second output during a reversal of the polarity of the output power to substantially reduce occurrences of rectification in the welding-type arc during the welding-type process;
wherein during a negative portion of the polarity, a first switch is switched on to provide a first current path from the power source, through the output inverter, through the first switch, and through the inductance to generate the welding-type arc, and to reverse the first current path, the first switch is switched off to provide a second current path through a first resonant circuit including the inductance; and
wherein during a positive portion of the polarity, a second switch is switched on to provide a third current path from the power source, through the output inverter, through the second switch, and through the inductance to generate the welding-type arc, and to reverse the third current path, the second switch is switched off to provide a fourth current path through a second resonant circuit including the inductance.

12. The welding-type power source of claim 11 further comprising a welding-type cable connecting the first output to a welding-type torch and a workpiece cable connecting the second output to a workpiece clamp, and wherein the welding-type cable has a first parasitic inductance associated therewith and the workpiece cable has a second parasitic inductance associated therewith and wherein the commutation energy is at least partially stored in the first parasitic inductance and the second parasitic inductance.

13. The welding-type power source of claim 11 wherein the inductance is formed by at least one of a non-coupled inductor and a cable.

14. The welding-type power source of claim 11 further comprising a pre-charging circuit configured to pre-charge the energy storage device upon startup of the welding-type power source.

15. A welding-type power source comprising:
a transformer having a primary side configured to receive an input AC power and a secondary side configured to deliver an output AC power;
a converter configured to convert the output AC power to DC power;
an inverter configured to receive the DC power and generate an AC welding-type power having a first half cycle and a second half cycle, and provide a switched current path for the first half cycle and the second half cycle of the AC welding-type power;
a first switch and a first output configured to deliver an output power to a connection to a welding-type torch, the connection to the welding-type torch having a first parasitic inductance associated therewith;
a second switch and a second output configured to deliver the welding power to a connection to a workpiece, the connection to the workpiece having a second parasitic inductance associated therewith;
an energy storage device connected to receive a commutation energy associated with the parasitic inductance connected to the first output during the first half cycle and deliver the commutation energy to the second output during the second half cycle;
wherein during the first half cycle, the first switch is switched on to provide a first current path from the secondary side, through the converter, through the first switch, and through the first parasitic inductance to generate the AC welding-type power, and to reverse the first current path, the first switch is switched off to provide a second current path through a first resonant circuit including the first parasitic inductance; and
wherein during the second half cycle, the second switch is switched on to provide a third current path from the secondary side, through the converter, through the second switch, and through the second parasitic inductance to generate the AC welding-type power, and to reverse the third current path, the second switch is switched off to provide a fourth current path through a second resonant circuit including the second parasitic inductance.

16. The welding-type power source of claim 15 further comprising a pre-charging circuit configured to pre-charge the energy storage device upon startup of the welding-type power source.

17. The welding-type power source of claim 16 wherein the transformer includes a boost winding and wherein the pre-charging circuit is connected to receive power from the boost winding to pre-charge the energy storage device.

18. The welding-type power source of claim 16 wherein the pre-charging circuit is connected to receive the output AC power from the transformer to pre-charge the energy storage device.

19. The welding-type power source of claim 1 further comprising an energy storage device connected to receive a commutation energy stored in the inductance during deliver of one of the respective portions of the AC welding-type power to the inductance and deliver the commutation energy back to the inductance during delivery of another of the respective portions of the AC welding-type power to the inductance.

* * * * *

UNITED STATES PATENT AND TRADEMARK OFFICE
CERTIFICATE OF CORRECTION

| | | |
|---|---|---|
| PATENT NO. | : 8,299,398 B2 | Page 1 of 1 |
| APPLICATION NO. | : 11/836898 | |
| DATED | : October 30, 2012 | |
| INVENTOR(S) | : Michael D. Madsen | |

It is certified that error appears in the above-identified patent and that said Letters Patent is hereby corrected as shown below:

Column 9, line 19 "portions" should be --portion--

Signed and Sealed this
First Day of January, 2013

David J. Kappos
*Director of the United States Patent and Trademark Office*